Aug. 29, 1939.　　J. W. CHALMERS　　2,171,172
WRAPPING MACHINE
Filed May 5, 1937　　17 Sheets-Sheet 1

Inventor
John W. Chalmers.
By Watson, Coit, Morse & Grindle
Attys.

Aug. 29, 1939.   J. W. CHALMERS   2,171,172
WRAPPING MACHINE
Filed May 5, 1937   17 Sheets-Sheet 2
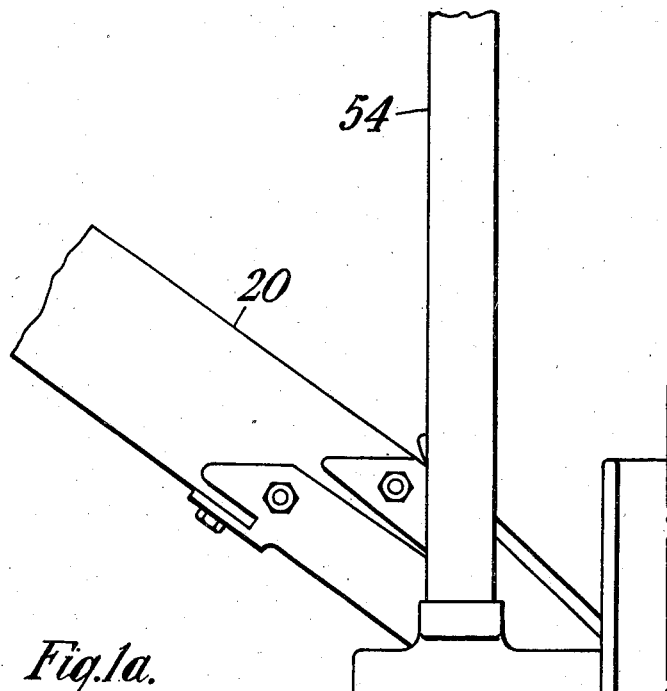
Fig.1a.
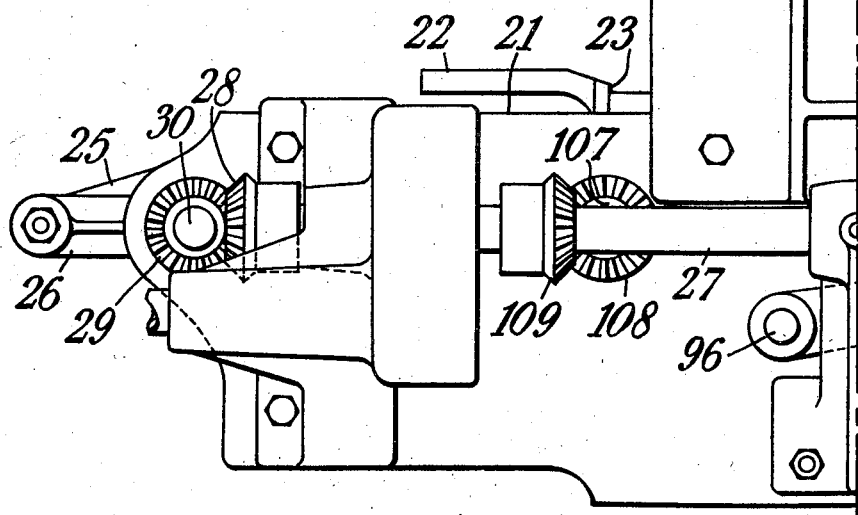
Inventor
John W. Chalmers.
By Watson, Coit, Moore & Grindle
ATTYS.

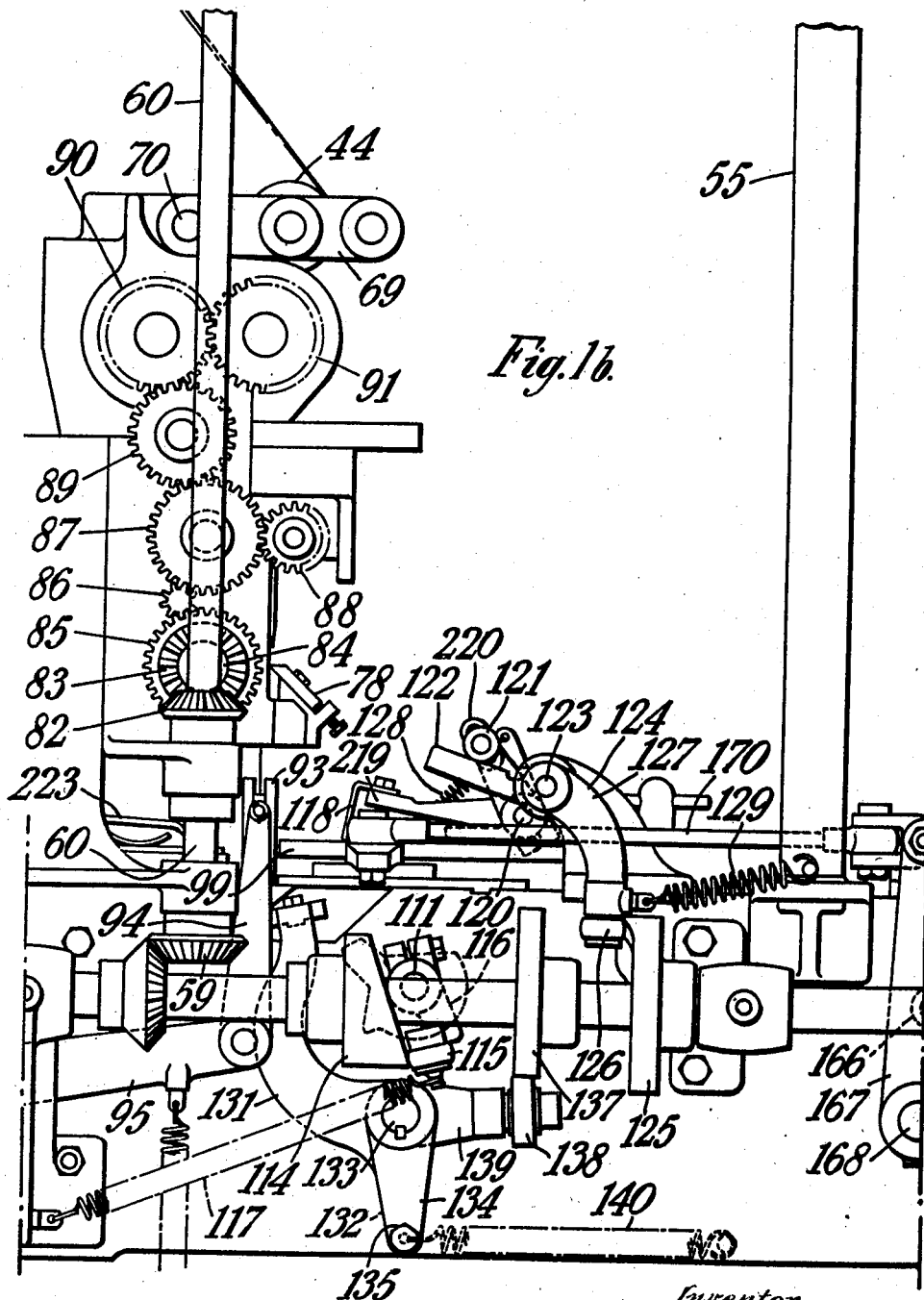

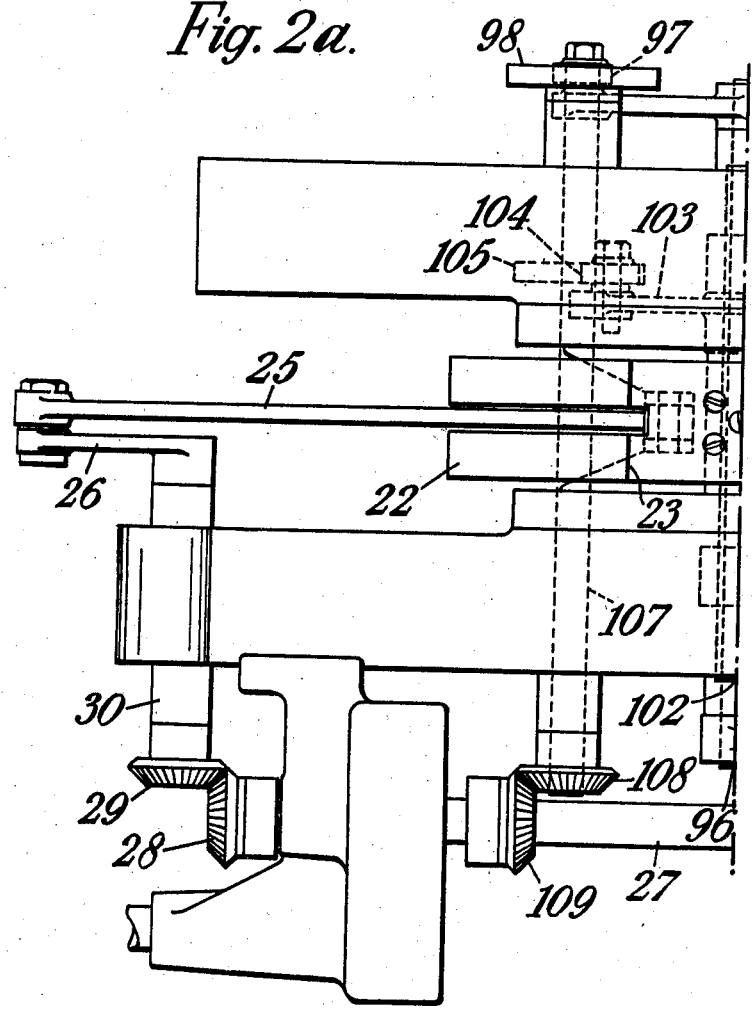

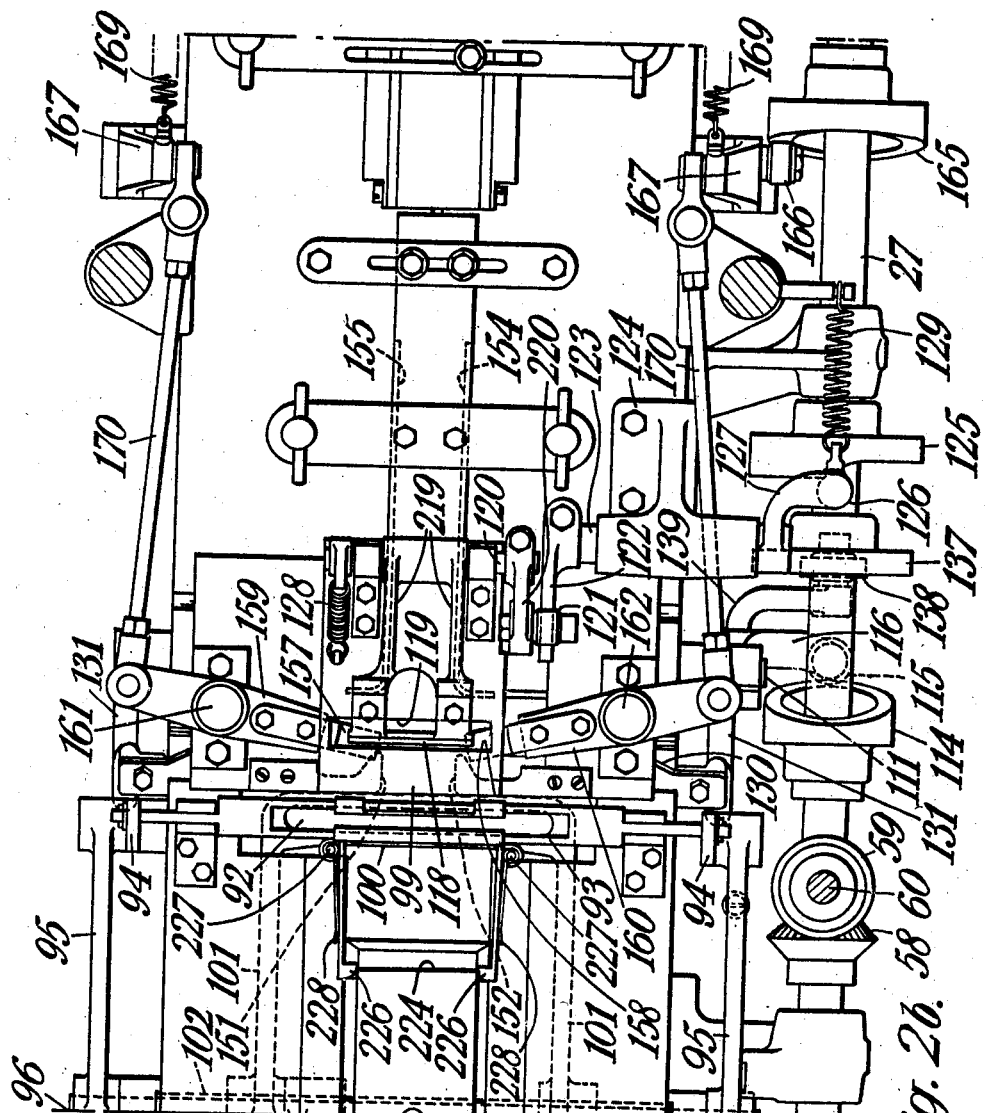

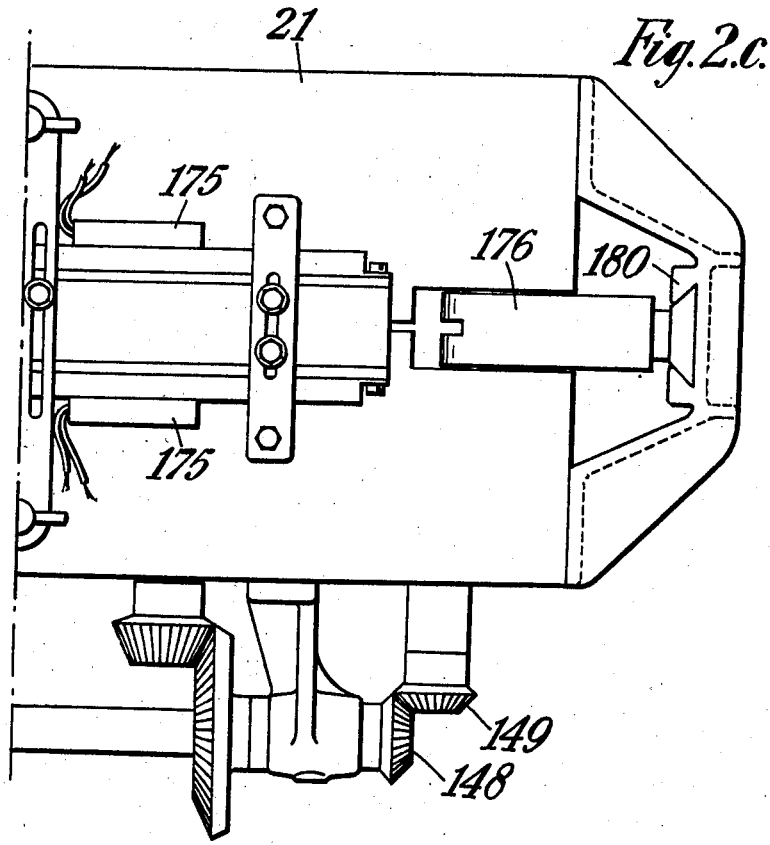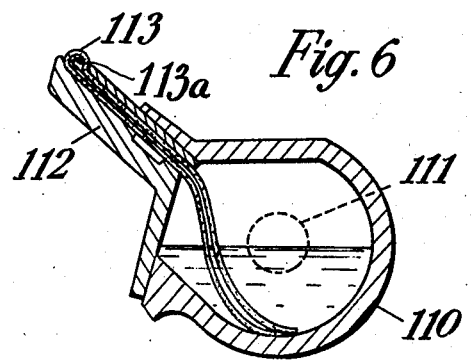

Aug. 29, 1939.　　J. W. CHALMERS　　2,171,172
WRAPPING MACHINE
Filed May 5, 1937　　17 Sheets-Sheet 9
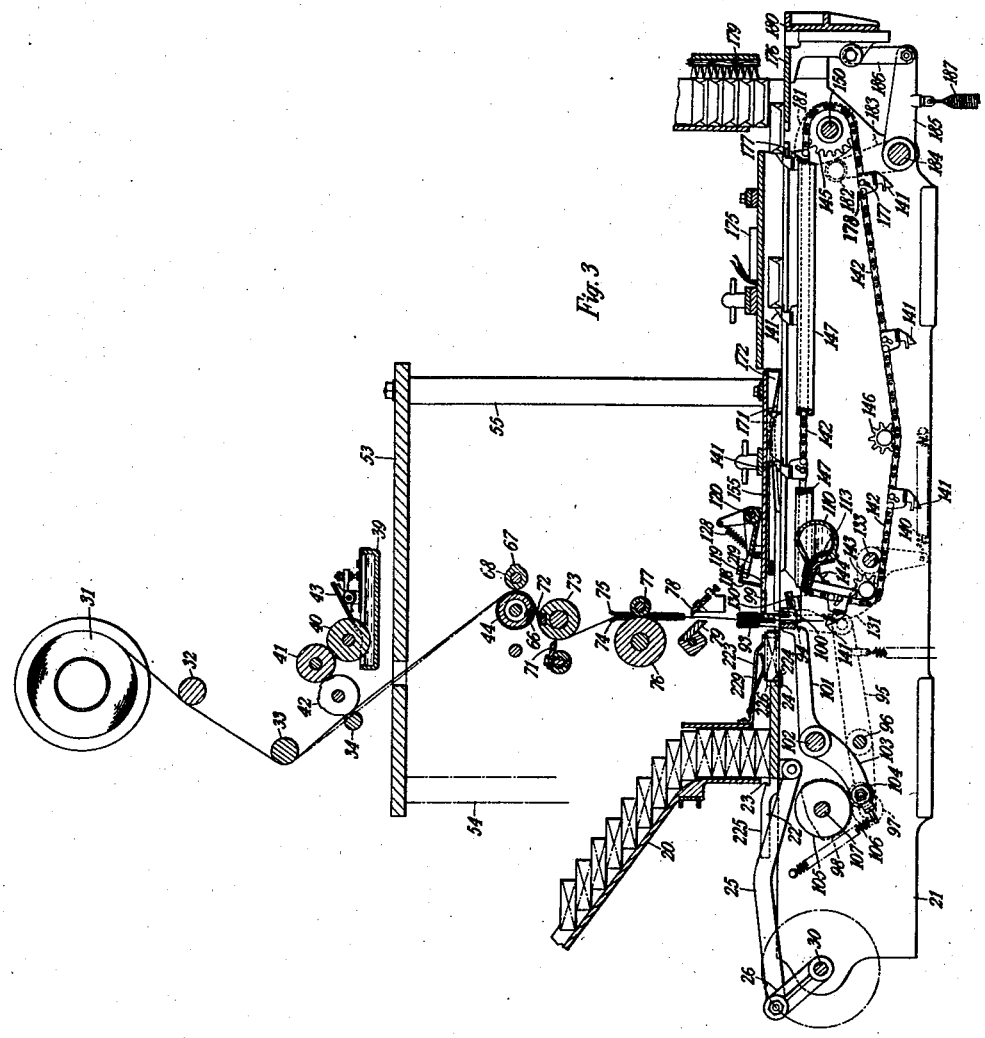
Inventor
John W. Chalmers
By Watson Coit Moore & Grinder
Attys.

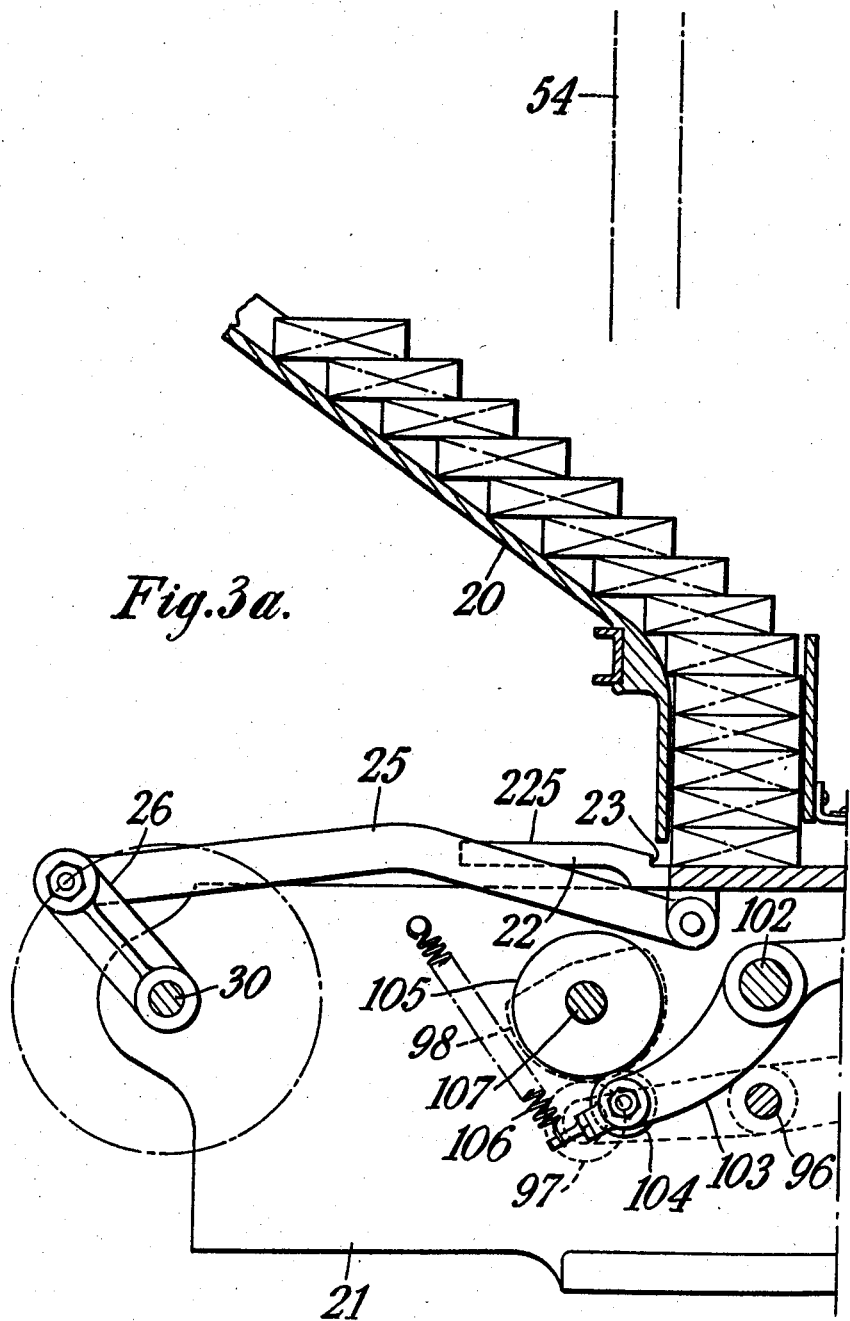

Aug. 29, 1939. J. W. CHALMERS 2,171,172
WRAPPING MACHINE
Filed May 5, 1937 17 Sheets-Sheet 11

Inventor
John W. Chalmers,
By Watson, Coit, Morse & Grindle
Attys.

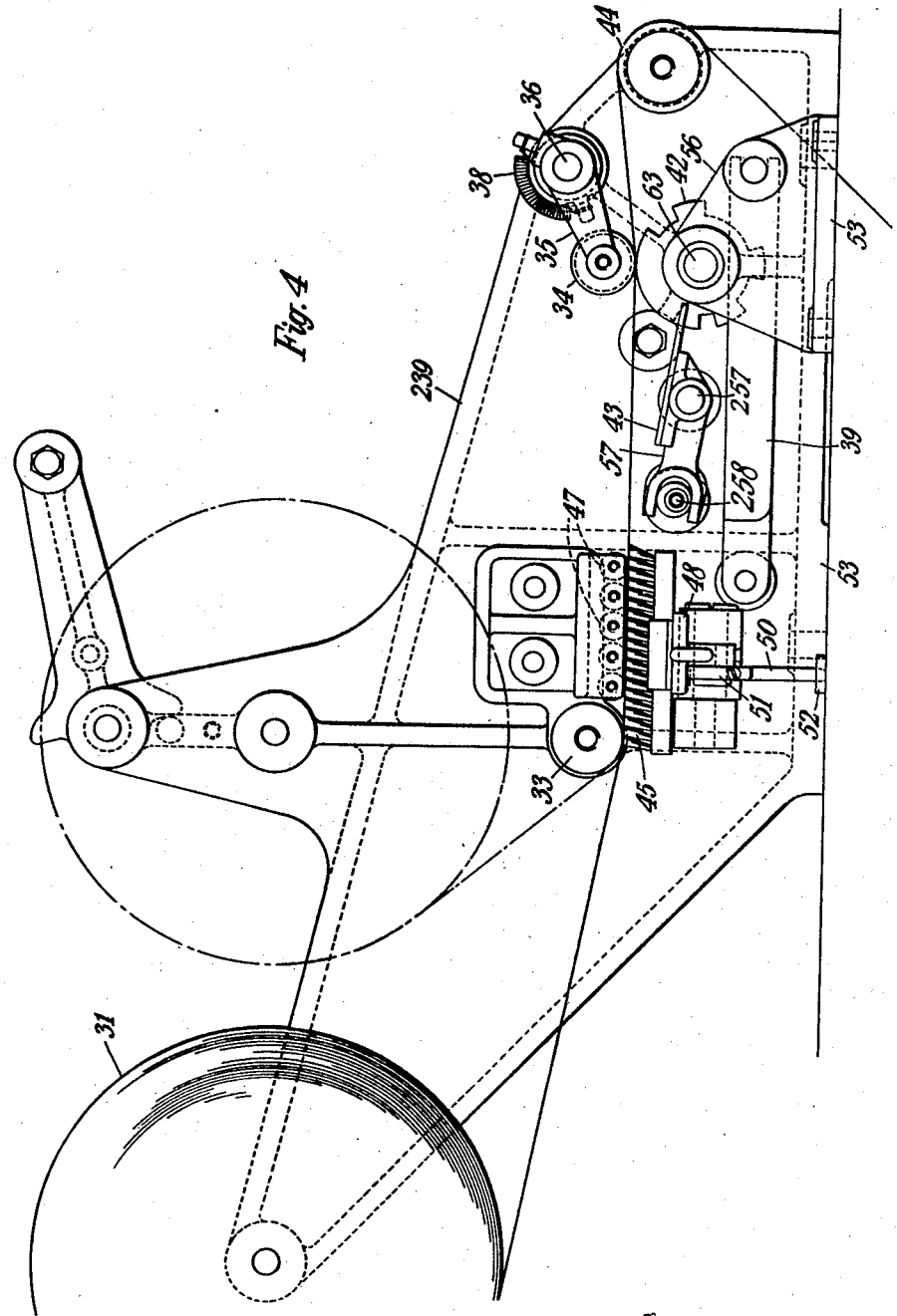

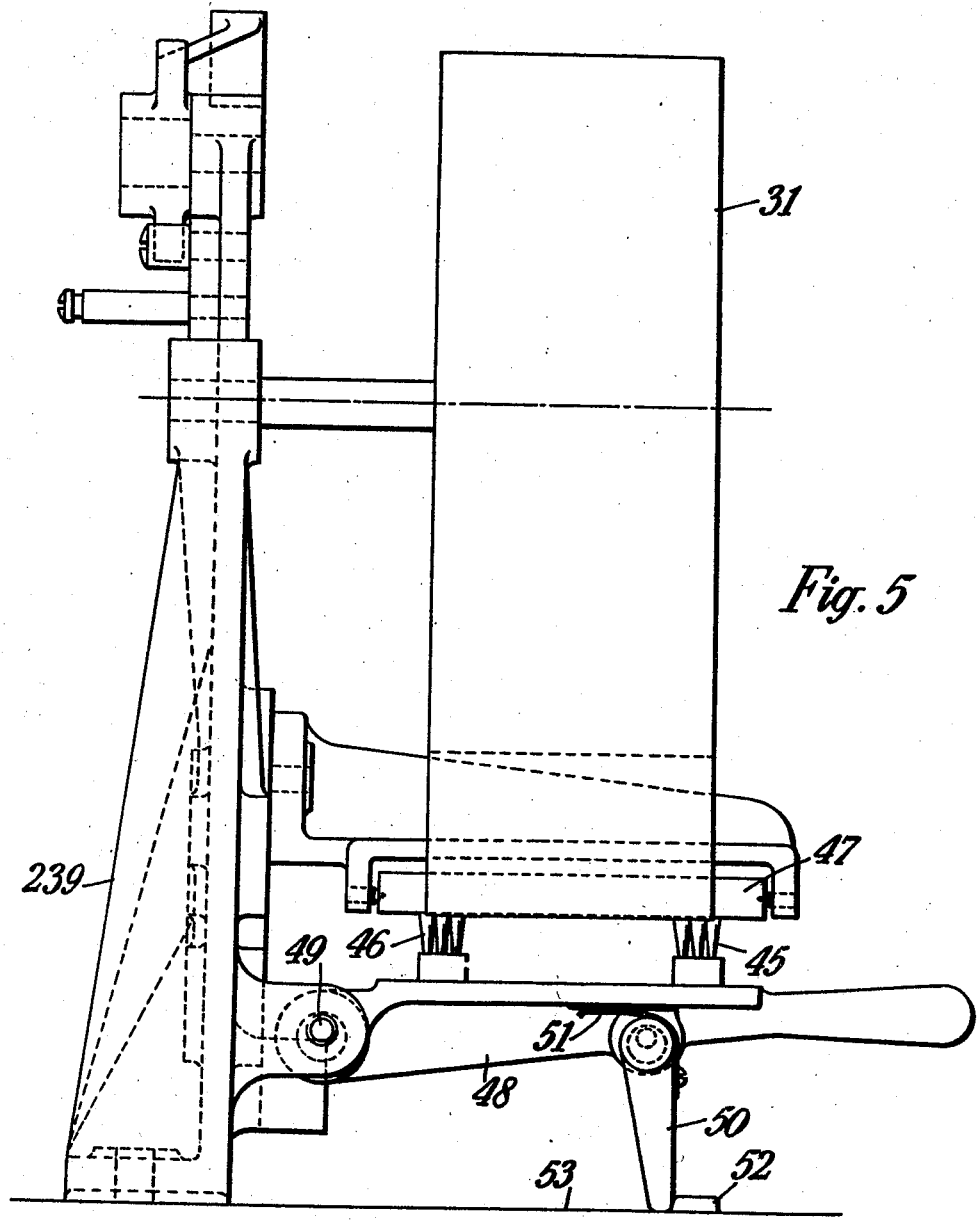

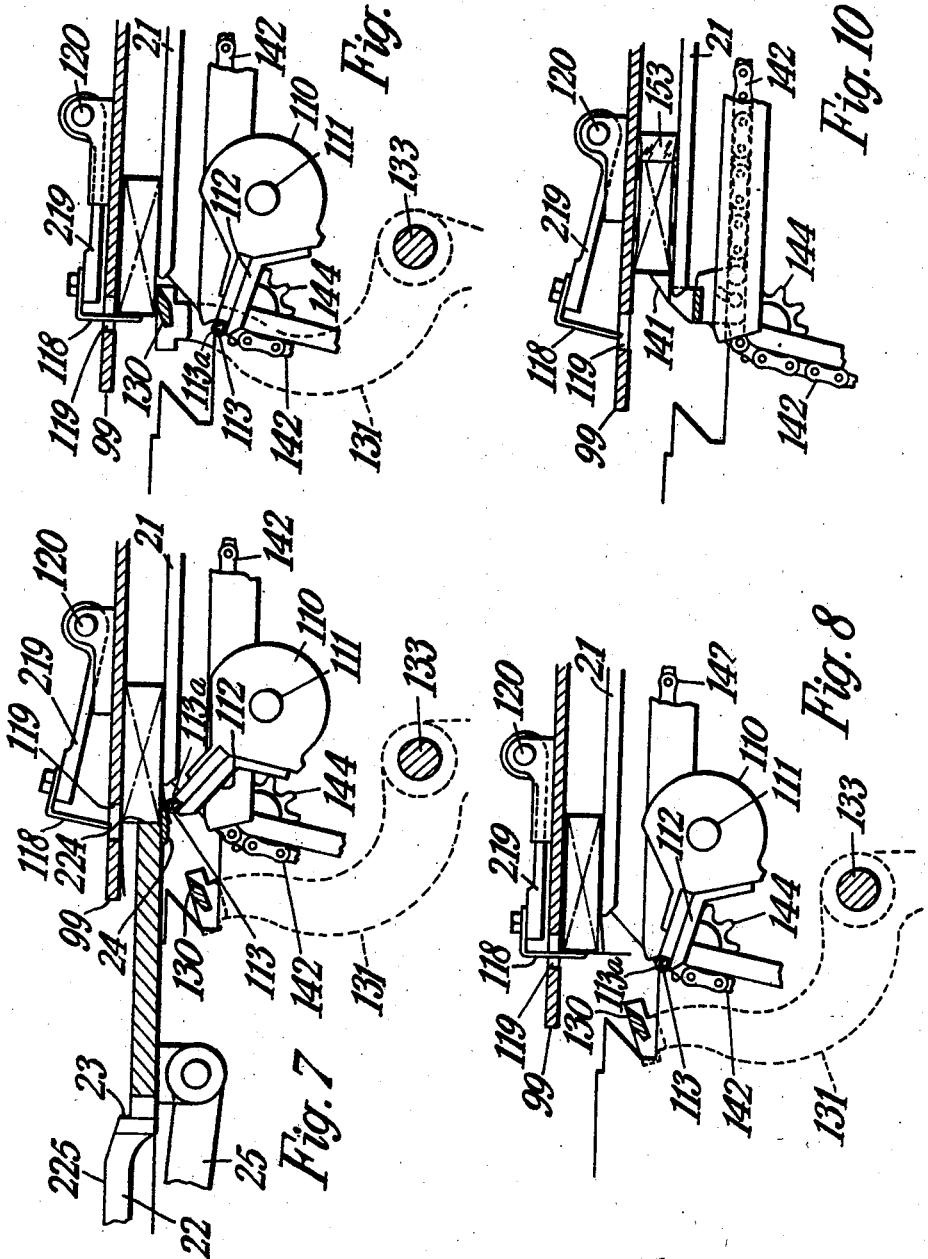

Aug. 29, 1939.  J. W. CHALMERS  2,171,172
WRAPPING MACHINE
Filed May 5, 1937   17 Sheets-Sheet 16

Inventor
John W. Chalmers.
By Watson, Coit, Morse & Grindle
Attys.

Aug. 29, 1939.　　　J. W. CHALMERS　　　2,171,172
WRAPPING MACHINE
Filed May 5, 1937　　17 Sheets-Sheet 17
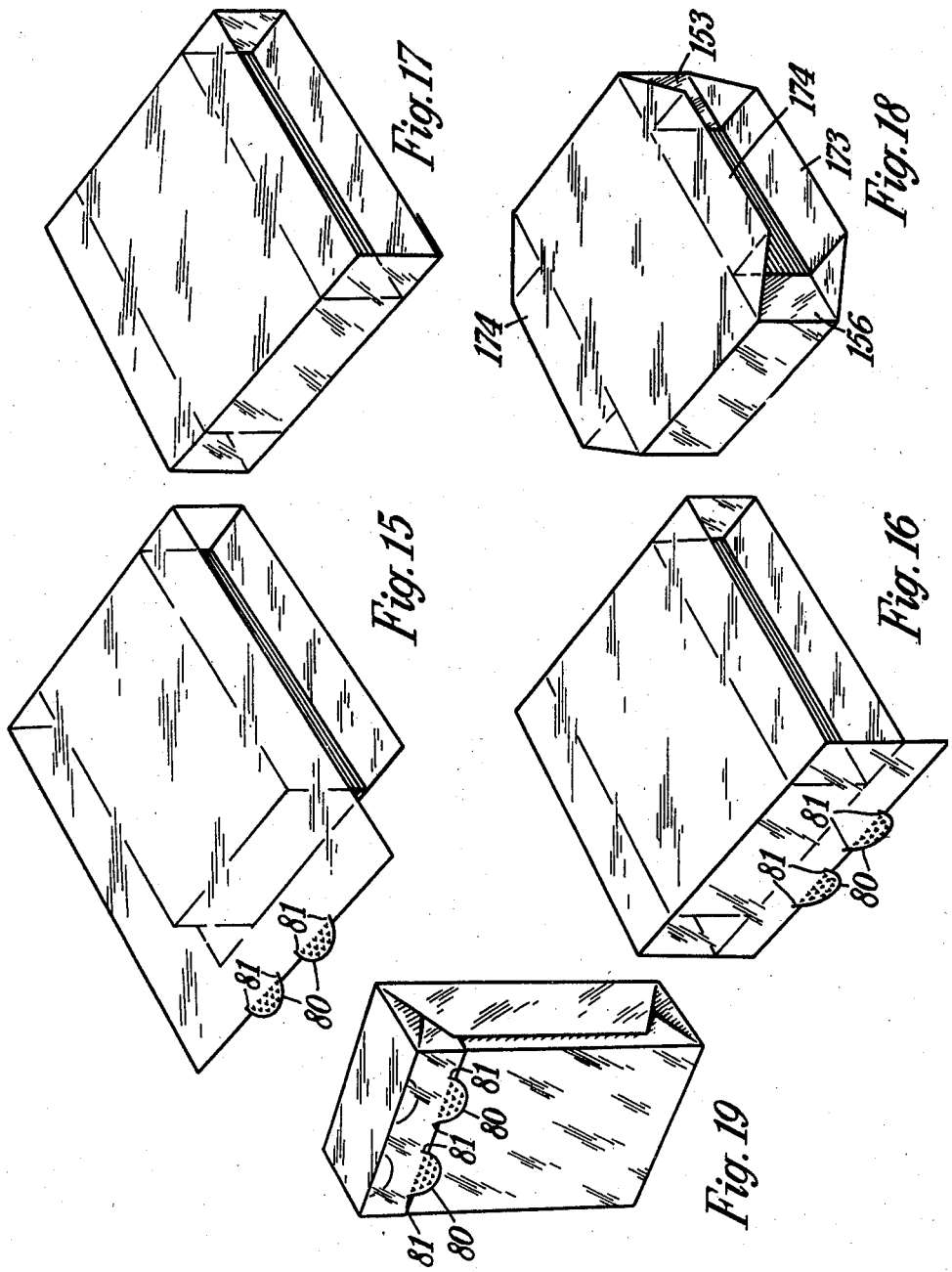

Patented Aug. 29, 1939

2,171,172

UNITED STATES PATENT OFFICE 2,171,172

WRAPPING MACHINE

John Walker Chalmers, Deptford, London, England, assignor to Molins Machine Company, Limited, London, England Application May 5, 1937, Serial No. 140,977

8 Claims. (Cl. 93—2)

This invention is for improvements in wrapping machines and has for one of its objects to provide an improved machine for wrapping articles, for example, cigarette packages, in transparent wrapping material formed from a cellulose derivative, one form of such wrapping material being known by the registered trademark "Cellophane".

Some features of the invention are the provision of improved apparatus for feeding wrapping material to the machine and for preparing the wrapping material for the application of adhesive thereto, and an improved adhesive applying device. Other features will be described herein and set forth in the appended claims.

Where herein the term "adhesive" is used it is to be understood as including cellulose solvent such as are used when wrapping material is formed from cellulose derivatives.

The accompanying drawings in which like references refer to like or similar parts, illustrate a machine constructed in accordance with the invention.

In the drawings—

Figures 1a, 1b and 1c show the lower part of Figure 1 drawn to an enlarged scale.

Figures 2a, 2b and 2c show Figure 2 drawn to an enlarged scale.

Figure 3 is a sectional elevation taken along the longitudinal centre line of the machine as viewed in Figure 2.

Figures 3a, 3b and 3c show Figure 3 drawn to an enlarged scale.

Figure 4 is a side elevation of web feeding mechanism and mechanism for applying adhesive to a web of wrapping material and is an alternative construction of the web feeding mechanism shown in Figures 1 and 3.

Figure 5 is an end elevation of Figure 4.

Figure 6 is a detail showing an adhesive applying device.

Figures 7, 8, 9 and 10 illustrate the operation of the adhesive applying device shown in Figure 6 and the operation of some of the folding elements for folding a wrapper about an article.

Figures 15 to 19 show a sequence of stages through which a wrapper passes whilst it is being folded about an article.

Figure 1:
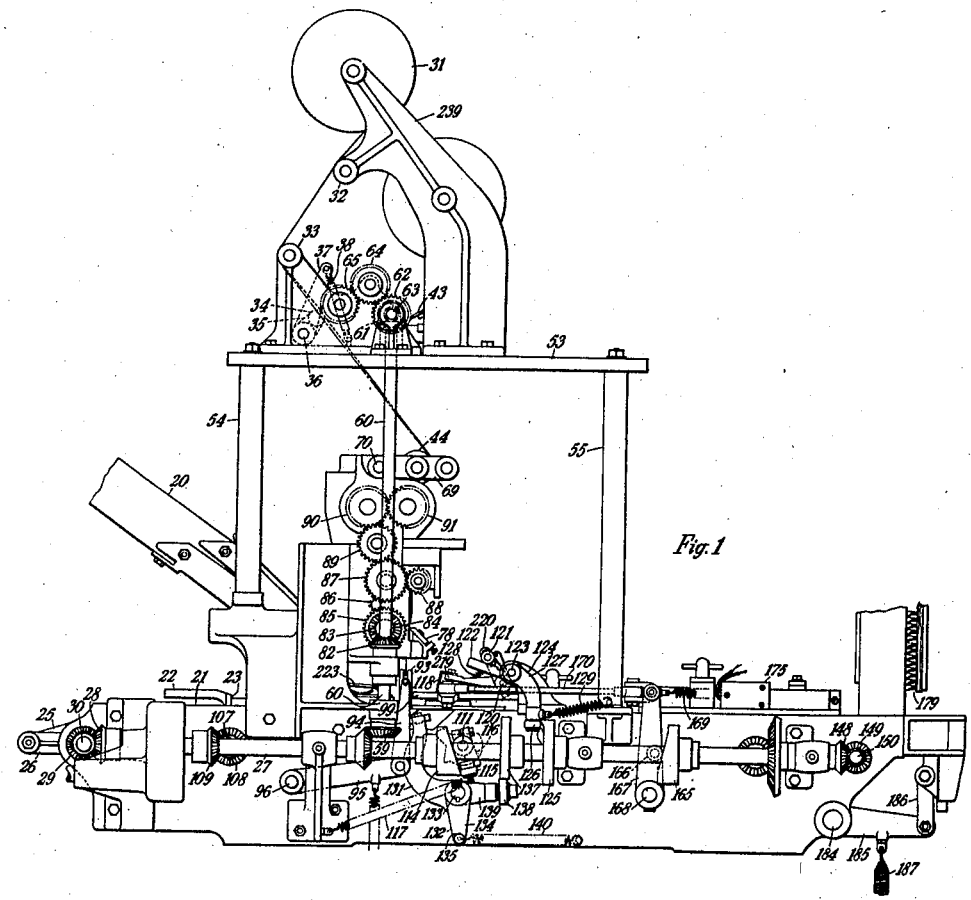
Figure 1 is a side elevation of the wrapping machine.

The articles to be wrapped are contained in a magazine 20 and they are delivered by gravity on to a plunger 22 which finally delivers them on to the bed 21 of the wrapping machine. The plunger 22 removes the articles from the bottom of the magazine one at a time, the step 23 of the plunger engaging with the rear end of an article, and moving the article forwardly beneath a plate 223. The articles are moved to the wrapping mechanism by the plunger 22 in two stages, the first stage being effected by the face 23 and the second stage by the face 224 whilst a projection 24 secured to the plunger 22 engages with the underside of an article. Operation of the plunger 22 is effected by an arm 25 connected with a crank 26 which is driven from the main driving shaft 27 of the machine. The crank 26 is supported by a spindle 30 and a bevel gear wheel 29 on the spindle 30 intermeshes with a bevel gear wheel 28 on the shaft 27 thereby transmitting motion from the shaft 27 to the spindle 30.

Whilst the face 224 is moving an article into engagement with a wrapper a second article is carried beneath the plate 223 by the step 23 and the bulk of the articles contained in the magazine are supported by the upper face 225 of the plunger. On the return stroke of the plunger 22 the rear end of said second article is engaged by catches 226 pivoted at 227 and controlled by springs 228. The catches 226 are opened by the article on its forward movement but once past them the catches are sprung into position behind the article to arrest its movement on the return stroke of the plunger. A spring 229 which projects through the plate 223 presses the said second article on to the bed 21 when the face 224 of the plunger has moved beyond the rear end face of the article. During this return stroke the next article which is lying on the surface 225 is engaged by the rear of the magazine and pushed onto the lower surface of the plunger where it is engaged by the step 23. It will be seen, therefore, that on the next forward stroke of the plunger 22 a further article will be moved out of the magazine 20 and the face 224 of the plunger will engage the article pressed on to the bed of the machine by the spring 229 and the article so engaged by the face 224 will be moved into engagement with a wrapper blank which has been fed transversely into the path of the article.

The wrapping material is fed from a reel 31 and is passed over guide rollers 32, 33 and 34 and so to cutting mechanism described below.

The guide roller 34 is carried by an arm 35 secured to a spindle 36 and is controlled by a further arm 37 also secured to the spindle 36 and a spring 38 one end of which is connected with the arm 37. As can be seen from the drawings, the reel support 239 is arranged to support two reels of wrapping material so that as little time as possible is lost in changing reels when one reel is finished. This arrangement of two reels on a support is not, however, novel, but is commonly used on wrapping machines.

Figure 3B:
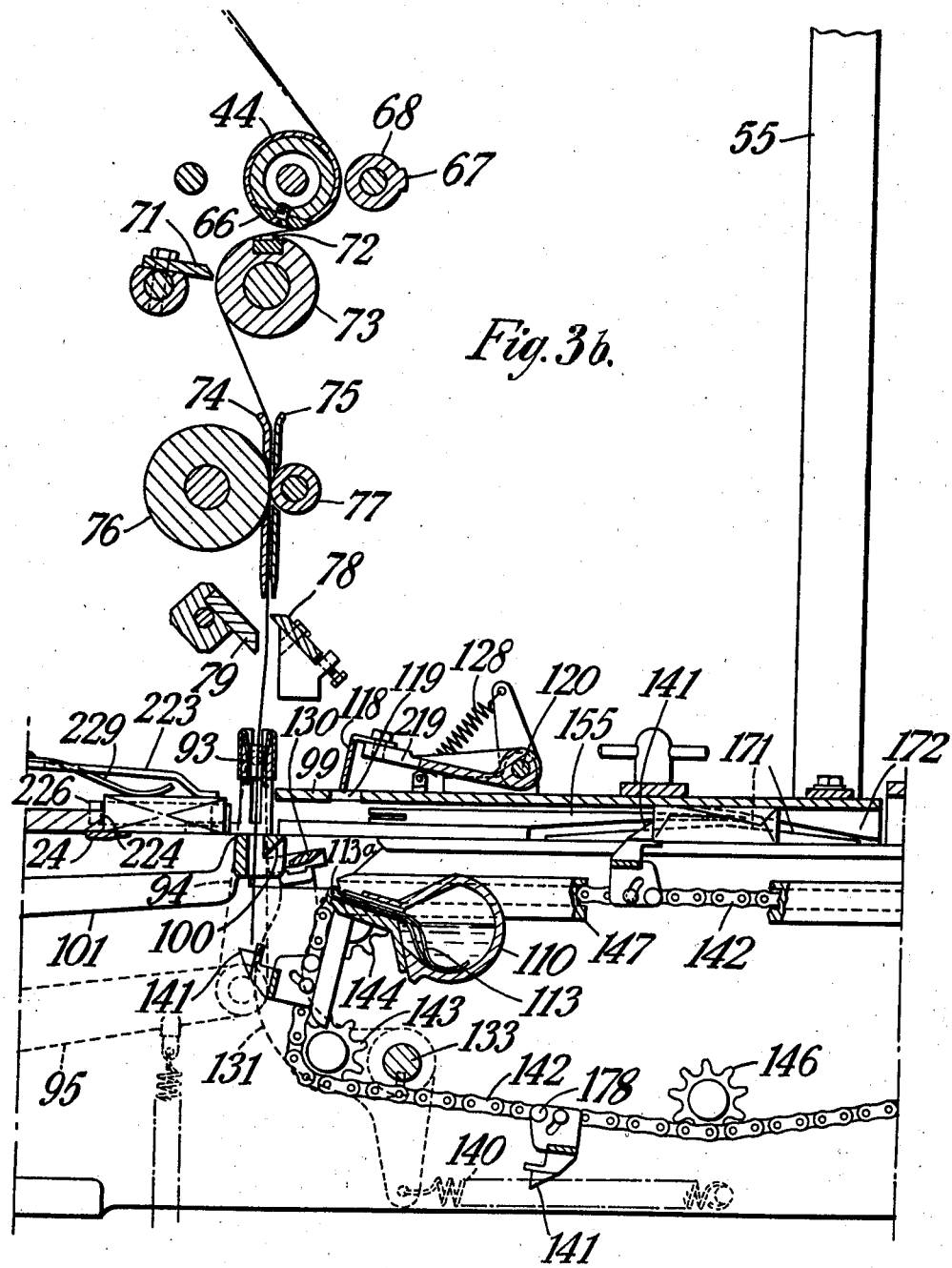
Figure 3C:
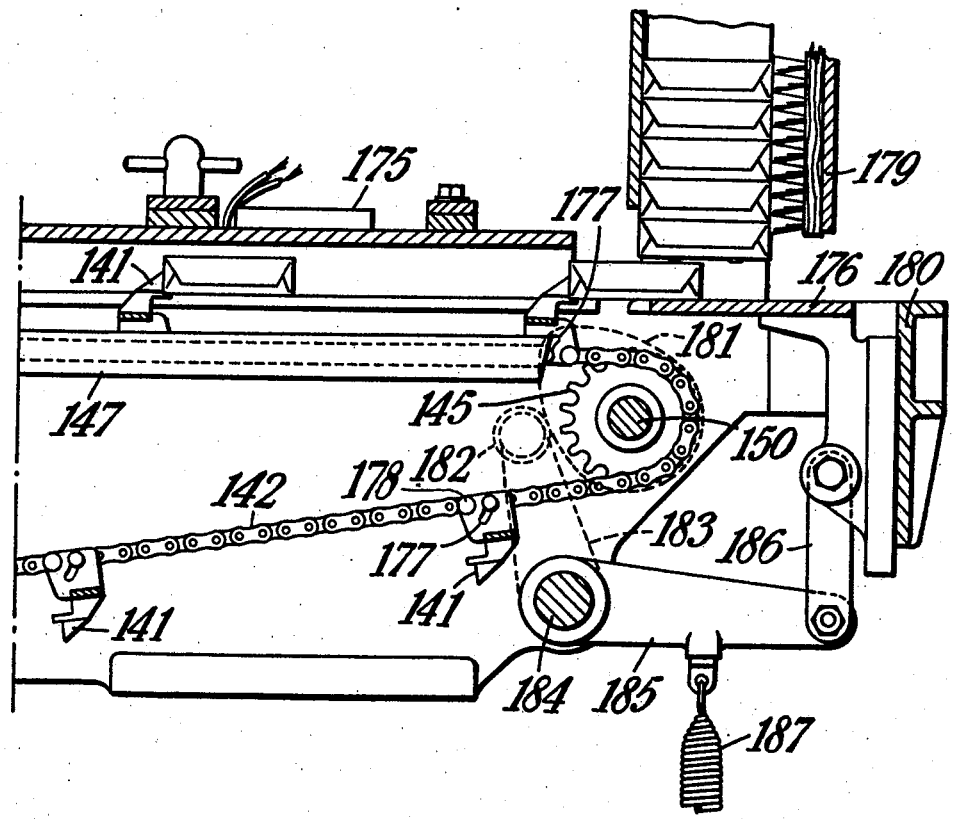

The web of wrapping material after passing the guide roller 33 is moved into engagement with an adhesive applying device which comprises, in the form shown in Figures 1 and 3, an adhesive container 39, a pair of transfer rollers 40 and 41 which transfer the adhesive from the container 39 and a pair of discs 42 which are arranged to engage with the web of wrapping material at points adjacent the longitudinal edges thereof and to apply adhesive at the required positions along the length of the web. A doctor 43 is arranged to scrape excess adhesive from the surface of the transfer roller 40.

As will be seen from Figures 1 and 3, the guide roller 34 is arranged so that when the wrapping machine is being operated, the roller 34 presses the web of material into engagement with the discs 42. When, however, the machine is stopped, it is desirable that the web of wrapping material should be moved out of engagement with the discs 42. The arms 35 and 37 may, therefore, be pivoted about the axis of the spindle 36 and away from the disc 42. The arrangement of the guide roller 33 and the roller 44 around which the web passes to the cutting mechanism is such that the web will be arranged in a straight line which is tangential to the rollers 33 and 44 when the guide roller 34 releases the pressure which presses the web into engagement with the disc 42. When the pressure is released, therefore, the web moves for a short distance away from the surface of the discs 42 as indicated in chain line in Figure 1.

An alternative but preferred form of web feeding apparatus for use in the wrapping machine being described is shown in Figures 4 and 5, and from Figure 4 it will be seen that the web of wrapping material as it passes from the reel 31 is passed over a pair of brushes 45 and 46 (Figure 5) and beneath a movable surface with which the brushes co-operate, the movable surface being shown in the drawings as a plurality of freely rotatable rollers 47. As can be seen from the drawings the bristles of the brushes are inclined in the direction of movement of the web. It will be appreciated that if desired, instead of a movable surface co-operating with the brushes, a fixed surface may be used. A movable surface is, however, preferable, because it is not necessary to wipe that surface of the web which is engaged by the movable surface and by using a movable surface the friction on the web is less than it would be if a fixed surface were used.

It is found that wrapping material formed from a cellulose derivative usually has a surface to which it is difficult evenly to apply adhesive. It is thought that this is due to the presence of wax or some other substance which is used in the manufacture of the material. By passing those portions of the web which are to have adhesive applied thereto between the brushes 45 and 46 and the moving surfaces 47 in a manner such that the brushes press on the surface to which the adhesive is to be applied, the surface of the wrapping material is wiped in a manner such that a satisfactory line of adhesive may be applied to the material so that when the wrapping material is folded about the article the adhesive will cause the folded portions of the material to adhere to each other in a much more satisfactory manner than is the case when the wrapping material is not treated in the manner above described.

The brushes 45 and 46 are mounted on a support 48 carried by an eccentric spindle 49 disposed in bearings formed in the support 239. A catch 50 is pivoted to the support 48 and is controlled by a spring 51 which urges the catch 50 against a projection 52 secured to the plate 53 upon which the frame 239 and the adhesive applying device is supported above the bed of the machine. As can be seen from Figure 1, the plate 53 is supported by pillars 54 and 55. When it is desired to thread a web of material to the wrapping machine, the catch 50 is moved to the left of Figure 5, thus allowing the support 48 to move downwardly away from the moving surfaces 47.

It will be seen that in the alternative construction shown in Figure 4 the adhesive applying device is different from that shown in Figure 1, in that the transfer rollers 40 and 41 are dispensed with and the discs 42 transfer the adhesive directly from the container 39 to the web of wrapping material. In the construction shown in Figure 4 the discs 42 are mounted for rotation in bearings carried by a bracket 56 secured to the plate 53, the arrangement being such that the container 39 can be removed for the purposes of cleaning and re-filling without disturbing the setting of the discs 42. In this construction the doctor 43 is also mounted independently of the adhesive container 39 and is carried by a support 57 pivoted at 257 to the frame 239. An eccentric pin 258 is provided to adjust the support 57. By rotating the support 57 the doctor may be adjusted relatively to the discs 42.

The adhesive applying device is rotated by the main shaft 27 through bevel gears 58 and 59, the gear 59 being secured to a spindle 60 to which a further bevel gear 61 is secured, the gear 61 intermeshing with a further bevel gear 62 secured to the spindle 63 to which the transfer roller 40 is secured in the construction shown in Figure 1.

In the construction shown in Figure 4 the discs 42 are secured to the spindle 63 instead of the transfer roller 40 being secured thereto.

Referring again to the adhesive applying device shown in Figure 1, the transfer roller 41 and the discs 42 are rotated by gear wheels 64 and 65 which intermesh with each other, the gear wheel 64 also intermeshing with a gear wheel carried by the spindle 63.

After adhesive has been applied to the longitudinal edge portions of the wrapping material, the web of material is passed to cutting mechanism which severs the web into wrapper blanks and also to mechanism which forms a tab or tab portions at one end of a wrapper blank. In the construction shown in Figure 1 the roller 44 over which the web of wrapping material is passed after leaving the adhesive applying device, comprises one of a pair of rollers arranged to knurl the web of wrapping material at positions where tongue or tab portion or portions is or are to be formed.

An inset 66 is secured to the roller 44 and is made of hardened steel and provided with a raised profile which presses into the wrapping material whilst the raised portion of the inset 66 is co-operating with a fibre inset 67 carried by a roller 68. Wrapping material which is formed from a cellulose derivative is difficult to knurl and it is found that a fibre inset gives better results than would be obtained by a rubber roller or other surface co-operating with the inset 66.

The rollers 44 and 68 receive motion from the spindle 60 by means of gearing (not shown). The co-operating insets 66 and 67 form two side by side knurled portions on the web of the paper, which portions conform substantially to the shape of the tongues or tabs later to be formed. When however only one tab is to be provided only one set of insets is used.

After passing the knurling device the web is passed to slitting mechanism comprising two cutting elements 71 and 72, the element 72 having, when two tabs are to be provided, two substantially semi-circular cutting edges which co-operate with the fixed knife 71, the cutting elements 72 being secured to a roller 73 for rotation therewith. The two cutting elements 72 are arranged in combination with the knife 71 to slit the web of material about those portions which have been knurled in the manner above described. After the slitting operation the web is passed between guides 74 and 75 and is fed by pulling rollers 76 and 77 to a fixed knife 78 with which co-operates a rotatable knife 79, the knives 78 and 79 being arranged to sever a wrapper blank from the web of wrapping material.

The knives 78 and 79 are arranged to slit the web transversely of its length the transverse slits communicating with the semi-circular slits already formed in the web at points adjacent the ends of the semi-circular slits, thus causing a length to be severed from the web which has two tongues or tab portions 80 which project beyond an edge of the wrapper so formed, see Figures 15, 16 and 19.

The opposite end of the wrapper blank is provided with two cut out portions which correspond with the tab portions formed on the preceding blank. The transverse slits formed by the cutting elements 78 and 79 do not meet the extremities of the semi-circular slits formed by the cutters 71 and 72 because it would be difficult so to arrange the cutting elements, but principally because if the edge of the wrapper is weakened it is more easily torn when a tab 80 is gripped and pulled to open the wrapping. Each of the tab portions has, therefore, slits 81 which are continuations of the semi-circular slits and which extend beyond the edge of the wrapper blank.

The cutting element 72 and the pulling rollers 76 and 77 are driven from the spindle 70 by means of a bevelled gear 82 secured to the spindle 60 and which intermeshes with a further bevelled gear 83 secured to the spindle 84 of the rotatable cutter 79. To the spindle 84 there is also secured a gear wheel 85 from which motion is transmitted to the rollers 76 and 77 and the cutting element 72 through a train of gears 86, 87, 88, 89, 90 and 91.

Figure 2:
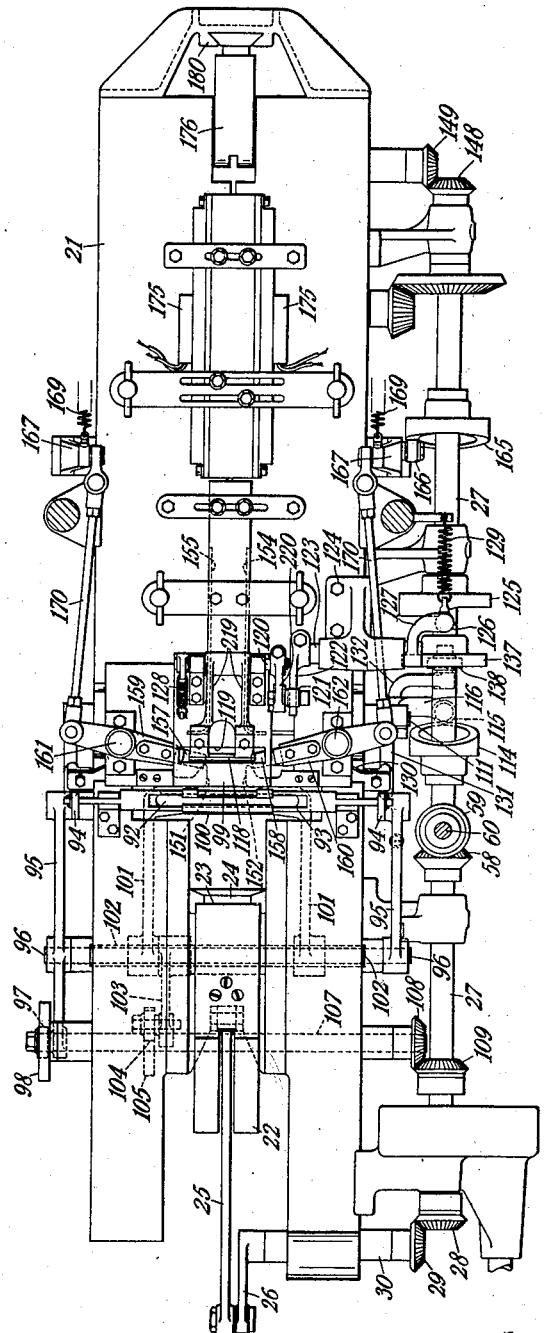
Figure 2 is a plan of Figure 1 with the top structure removed.

The end portion of the web of wrapping material passes through a slot 92, see Figure 2, in the bed 21 of the machine before a wrapper blank is severed from the web and the end portion of the web is guided into position by a guide 93 which is movable towards and away from the bed 21 of the machine. The guide 93 is supported by arms 94 pivoted to levers 95 secured to a spindle 96. One of the levers 95 is a double arm lever, one arm of which supports a cam follower 97 which co-operates with a cam 98, see Figure 3, the cam 98 being operative to reciprocate the guide 93.

The movement of the plunger 22 is so timed that the leading face of the article to be wrapped engages with the wrapper blank approximately at the moment it is severed from the web, and the continued movement of the plunger 22 causes the wrapper blank to be trapped between the top plate 99 and a movable guide 100 which is at that time flush with the surface of the bed 21. The movable surface 100 is supported by arms 101 secured to a shaft 102 and a further arm 103 is also secured to the shaft and carries a cam follower 104 which co-operates with a cam 105. A spring 106 maintains the cam follower 104 in contact with the cam 105. The cams 98 and 105 are mounted on a shaft 107 and the shaft 107 is rotated by a bevel gear 108 which intermeshes with a bevel gear 109 carried by the main shaft 27.

As the wrapper blank and article are moved beneath the top plate 99 and over the support 100 and so on to the bed of the machine to the right of the support 100, the wrapper blank is folded into a U form as shown in Figure 15, the lower limb of the U being of a length substantially equal to the length of the article as can be seen in Figure 15, whilst the upper limb of the U is longer than the lower limb and is arranged to be folded against the rear end face of the article and into contact with the lower limb of the U in the manner shown in Figure 17.

In order to permit the projection 24 on the plunger 22 to pass the position which the support 100 occupies when the wrapper is first trapped and folded about the leading end face of the article, it is necessary to move the support 100 below the bed of the machine to permit the projection 24 to pass. This movement is effected by means of the cam 105. The projection 24 prevents the end portion of the lower limb of the U from engaging the undersurface of the article when the wrapper blank is folded into a U about the article, and the purpose of maintaining this end portion of the wrapper material out of engagement with the article is to ensure that whilst adhesive is being applied to the end portion of the lower limb of the U the portion to which the adhesive is applied is supported by a rigid surface against which it is possible to apply a relatively hard pressure whilst applying the adhesive to the end portion of the wrapping material.

It will be appreciated that the articles being wrapped are in many instances of a soft nature, particularly is this the case when the articles are cigarette packages, and that in such cases it is difficult properly to apply adhesive to the wrapping material due to the fact that as the adhesive applying device presses against the wrapping material the article is compressed and a considerable part of the pressure applied for the purpose of applying the adhesive is, therefore, lost.

Whilst the plunger 22 is moving the wrapper and the article into the position at which the wrapper is folded into a U about the article an adhesive applying device is being moved into position to apply adhesive to the wrapping material. The adhesive applying device comprises a container 110 mounted on spindles 111 for rotation in bearings fitted in the bed of the machine. The container 110 is provided with a nozzle 112 and a wick 113 protrudes from the outlet of the nozzle and extends through the nozzle into the adhesive contained in the container 110. As can be seen from Figure 6 the wick 113 is doubled over a support 113A so that both ends of the wick are, or can be, located in the adhesive. The purpose of doubling the wick is to provide an adhesive applying surface which does not comprise an end of the wick and wicks doubled in the manner shown have been found to give better results than wicks in which an end thereof engages the surface to which adhesive is to be applied. The wick is made from chamois leather and it is found that such a wick is one which gives better results than wicks formed from other materials which have previously been used for the same purpose. The container 110 is oscillated about the axis of the spindles 111 by a cam 114 secured to the main shaft 27 and the cam cooperates with a cam follower 115 carried by an arm 116 secured to a spindle 111, contact between the cam 114 and the follower 115 being maintained by a spring 117. By reason of the cam 114 the container 110 is moved in timed relationship with the plunger 22 and is moved into the position shown in Figure 7 whilst the plunger is moving an article into position above the container 110. As the plunger 22 is moved on its return stroke the container 110 is moved downwardly towards the position shown in Figure 8 and is moved at a speed such that there is relative movement between the nozzle of the container and the support 24 thus causing the chamois wick 113 to press the end portion of the lower limb of the U of the wrapper against the support 24 and to apply adhesive thereto. As soon as the plunger 22 has been moved away from the end face of an article for a sufficient distance, a folding element 118 moves downwardly through a slot 119 in the top plate 99 and folds the end portion of the upper limb of the U downwardly into engagement with the rear end face of the article. The folder 118 is carried by an arm 219 secured to a spindle 120 and a further arm 220 is carried by the spindle 120 and supports a roller 121 which co-operates with the face of a cam 122 which is connected with a spindle 123 mounted in a bracket 124 secured to the bed 21 of the machine. The spindle 123 is oscillated by a cam 125 which co-operates with a cam follower 126 secured to an arm 127 which in turn is secured to the spindle 123. A spring 128 maintains the roller 121 in contact with the cam 122 and a spring 129 maintains the roller 126 in contact with the cam 125. Whilst the folder 118 is moving through its return stroke a folding element 130 engages with the downwardly projecting portion of the wrapper, see Figures 8 and 16, and folds that portion of the wrapper into engagement with the lower limb of the U.

Figure 11:
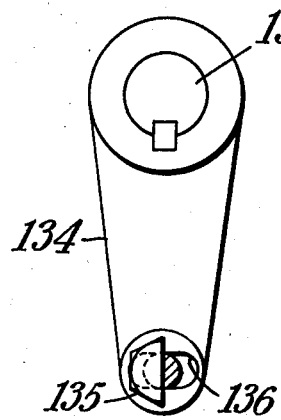
Figures 11 and 12 show an adjustment for one of the folding elements shown in Figures 7 to 10.
Figure 12:
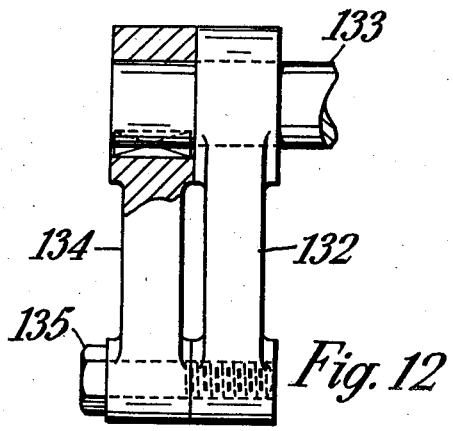
Figure 1C:
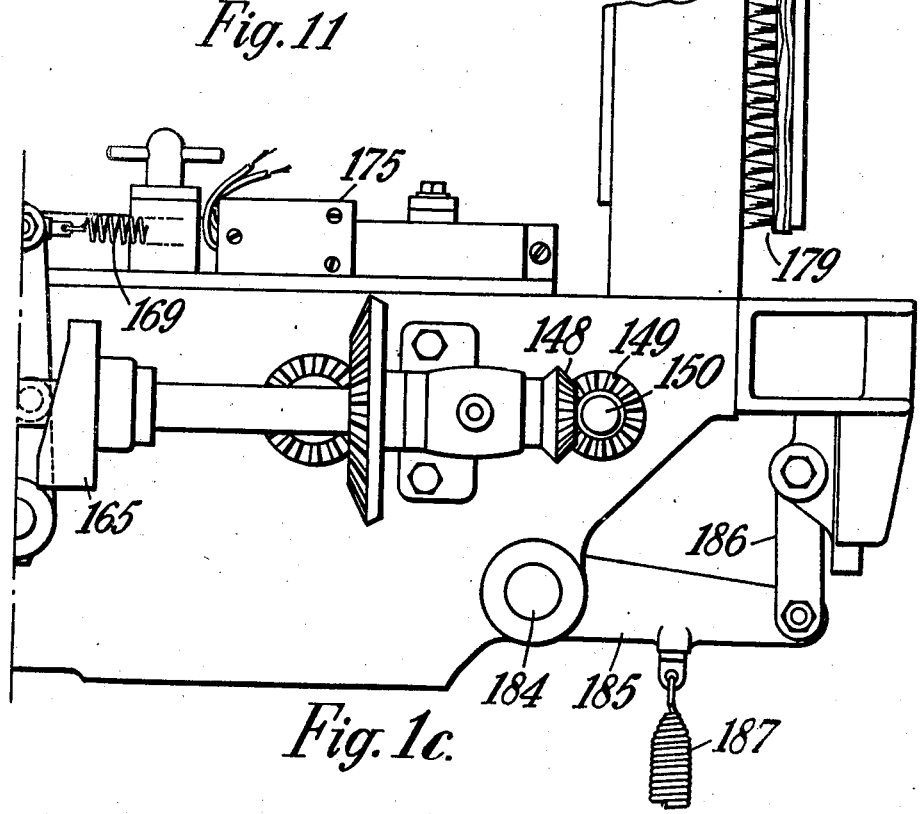

Due to the fact that adhesive has been applied to the lower limb of the U the overlapping portion of the upper limb of the U is caused to adhere to the lower limb, but the tongue portions 80 are not secured to the lower limb. The folding element 130 is supported by a pair of arms 131 and 132 mounted on a shaft 133. The arm 131 which comprises a bell crank lever is keyed to the shaft 133, but the arm 132 is freely mounted on the shaft 133 and is connected with a lever 134 by means of a screw or bolt 135 which passes through an arcuate slot 136 formed in the lever 134, see Figures 11 and 12. The lever 134 is keyed to the shaft 133. The reason for this arrangement is to provide a ready adjustment to facilitate the setting of the folding element 130. The folder 130 is operated by a cam 137 secured to the main shaft 27. A cam follower 138 is carried by one arm 139 of the bell crank 132 and is maintained in position against the face of the cam by a spring 140. When the folder 130 has been returned from the folding position the article which is now contained in a tubular wrapper, the ends of which extend lengthwise beyond two opposed faces of the article, is engaged by one of a series of pusher pieces 141 carried by an endless chain 142 which passes around sprockets 143, 144, 145 and 146 and which passes between fixed guides 147 whilst the pusher pieces 141 are moving over the surface of the bed of the machine. The endless chain 142 is continuously rotated by a bevel gear 148 which intermeshes with a bevel gear 149 secured to the shaft 150 to which the sprocket 145 is secured.

Figure 13:
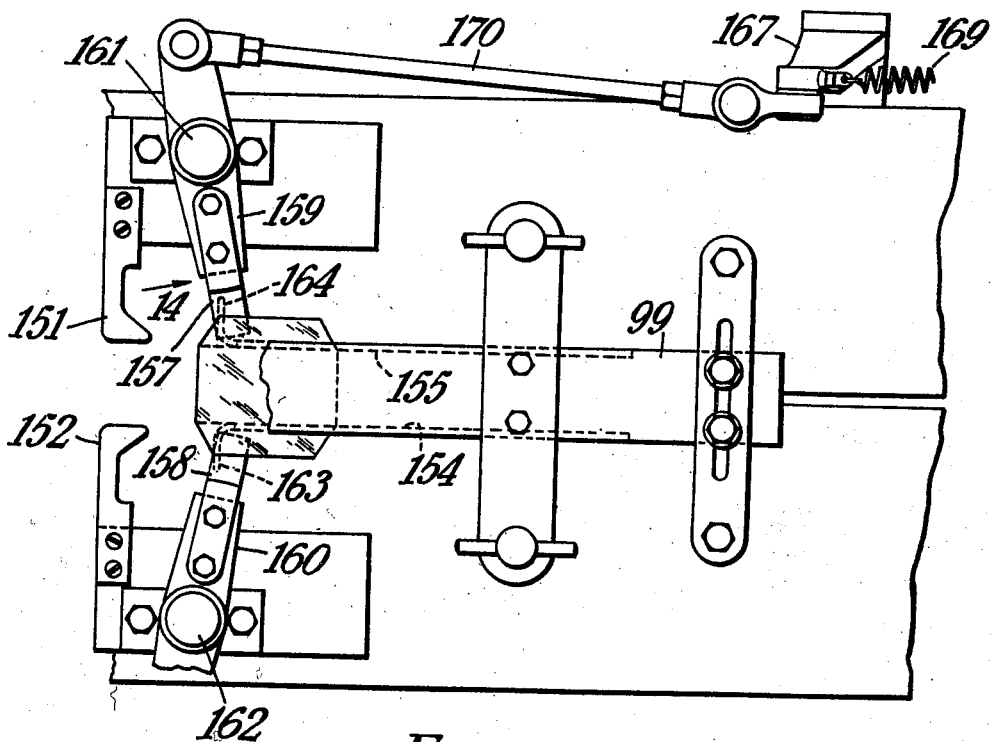
Figure 13 shows a detail of Figure 2 drawn to an enlarged scale.
Figure 14:
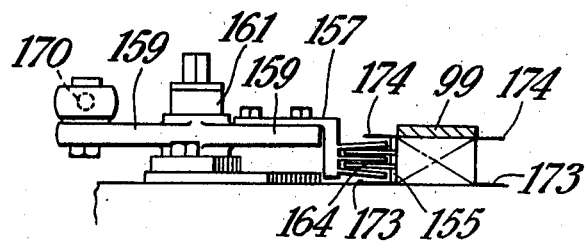
Figure 14 is an end elevation of a part of Figure 13 and is taken in the direction of the arrow 14.

As the article and tubular wrapper are moved forwardly, the leading portions of the parts of the projecting end portions of the tube are engaged by fixed guides 151 and 152 which form the narrow end folds 153, Figure 18. The continued movement of the pusher piece 141 then brings the wrapper and article between guides 154, 155, see Figure 13, which engage with the sides of the article and the end folds 153. The narrow end folds 156, Figure 18, are formed by folders 157, 158 carried by arms 159 and 160, the arms being pivoted at 161 and 162 respectively. The folders 157 and 158 are each formed with three prongs, as can be more clearly seen in Figure 14, the prongs being so spaced as evenly to engage with the wrapping material whilst it is being folded and the prongs spaced apart so as to pass between slots formed in the ends 163, 164 of the guides 155, 154 respectively.

The folders 157 and 158 are operated so as to fold the end folds 156 against the sides of the article before the end folds pass between the guides 154 and 155 so that the end folds 156 like the end folds 153, are controlled by the side guides 154, 155 during subsequent folding operations. The purpose of the end portions 163 and 164 on the guides 155, 154 respectively is to ensure that the narrow end folds 153 are correctly in position against the sides of the article when the article and wrapper are moved between the guides 154 and 155. The folders 157 and 158 are operated by a cam 165 secured to the main shaft 27 of the machine, and a cam follower 166 is carried by one of a pair of arms 167 mounted on a spindle 168 and is held against the face of the cam 165 by springs 169. To each of the arms 167 there is connected a rod 170, one rod being connected with the arm 159 whilst the other rod is connected with the arm 160.

Continued movement of the pusher piece 141 causes the partly wrapped article and wrapper to pass between stationary folding elements 171 and 172, see Figures 3 and 3b, the folding element 171 being arranged to fold the side fold 173, Figure 18, upwardly into engagement with the side of the article whilst the folding element 172 is arranged to fold the side folds 174 downwardly into engagement with the side folds 173. The side folds are secured together by reason of the adhesive which was applied to the longitudinal edges of the wrapping material by the discs 42 referred to above.

The wrapper blank is now completely folded about the article and the pusher pieces 141 pass the wrapped article between heating elements 175 which dry the adhesive between the folds of the wrapper and then the wrapped articles are delivered by the pusher piece 141 on to a reciprocable platform 176. The pusher piece 141 is provided with a slot 177 and as the wrapped article is delivered on to the platform 176 the pusher piece engages with a projection on the bed of the machine, and is caused to pivot rearwardly about the axis of the pin 178 by which it is secured to the chain 142, and the pusher piece is thus moved by the chain 142 beneath the bed of the machine.

The wrapped article on the platform 176 is then moved upwardly by the platform into a magazine 179, the platform 176 during this movement moving in a slide 180. The platform is operated by a cam 181 secured to the shaft 150, and a cam follower 182 carried by an arm 183 engages with the cam 181. The arm 183 is secured to a shaft 184 as is also a further arm 185, to which is connected a link 186 connecting the platform with the arm 185. A spring 187 maintains the cam follower 182 in contact with the cam 181.

What I claim as my invention and desire to secure by Letters Patent is:

1. In a wrapping machine the combination with mechanism to fold a wrapper blank into a tube about an article, said tube having overlapping edge portions to form a seam, of a device movable into and out of engagement with one of said edge portions to apply adhesive thereto to secure the seam, and a support movable relatively to and in timed relationship with said device to support that edge portion to which adhesive is applied whilst the adhesive is being applied and to hold the edge portion away from the article.

2. In a wrapping machine the combination with means to feed a wrapper blank transversely into the path of an article of a conveyor to move an article into engagement with the wrapper blank, mechanism to fold the wrapper blank into a tube about the article, said tube having overlapping edge portions to form a seam, a device movable into and out of engagement with one of said edge portions to apply adhesive thereto to secure the seam and a support movable in timed relationship with said device to support that edge portion to which adhesive is applied whilst the adhesive is being applied and to hold the edge portion away from the article, said support comprising a projection carried by said conveyor.

3. In a wrapping machine the combination with means to feed a wrapper blank transversely into the path of an article, of a conveyor to move the article into engagement with the wrapper blank, mechanism to fold the blank into a tube about the article, said tube extending lengthwise beyond two opposed ends of the article and having overlapping edge portions to form a seam, a device movable into and out of engagement with one of said edge portions to apply adhesive thereto to secure the seam, a support movable relatively to and in timed relationship with said device to support that edge portion to which adhesive is applied whilst the adhesive is being applied and to hold the edge portion away from the article and means to complete the folding of the wrapper by closing the open ends of said tube.

4. In a wrapping machine the combination with mechanism to fold a wrapper blank into a tube about an article, said tube extending lengthwise beyond two opposed end faces of the article, a conveyor to move the article and tube transversely to the longitudinal axis of the tube, folding elements to fold the leading extending end portions of the tube into the planes of the said end faces of the article, folding members movable in a path adjacent that of the tube and article and operative to fold into the planes of the said end faces of the article that projecting end portion of the tube opposed to the first folded projecting portions, said members having a plurality of wrapper engaging projections, guides to control said first folded projecting portions, said guides being provided with slots to receive said wrapper engaging projections, and means to complete the folding of the wrapper by folding the remaining projecting end portions of the tube into the planes of the said end faces of the article.

5. In a wrapping machine, means to sever wrappers from a web of wrapping material and to provide a tab projecting from an edge of the wrapper, means to roughen a surface of the tab, means to feed a wrapper into the path of an article to be wrapped, folding elements to fold the wrapper into a tube about an article, which tube extends lengthwise beyond opposed faces of the article and has a seam comprising overlapping opposite end portions of the wrapper, said tab being on the outer overlapping portion of the seam, means to complete the folding of the wrapper by closing the open ends of said tube, and means to apply adhesive to secure the seam and closure folds of the folded wrapper.

6. In a wrapping machine, means to sever wrappers from a web of wrapping material and to provide a tab projecting from an edge of the wrapper, a rotatable steel element and a rotatable fibre element which elements cooperate to roughen a surface of the tab, means to feed a wrapper into the path of an article to be wrapped, folding elements to fold the wrapper into a tube about an article which tube extends lengthwise beyond opposed faces of the article and has a seam comprising overlapping opposite end portions of the wrapper, said tab being on the outer overlapping portion of the seam, means to complete the folding of the wrapper by closing the open ends of said tube, and means to apply adhesive to secure the seam and closure folds of the folded wrapper.

7. In a wrapping machine, means to sever a wrapper from a web of wrapping material, means to provide a tab projecting from an edge of the wrapper, and means to roughen the surface of said tab.

8. In a wrapping machine, means to sever a wrapper from a web of wrapping material, means to provide a tab projecting from an edge of the wrapper, and means to roughen a surface of the tab, said last named means comprising cooperating rotatable steel and fiber elements.

JOHN WALKER CHALMERS.